Patented Nov. 12, 1940

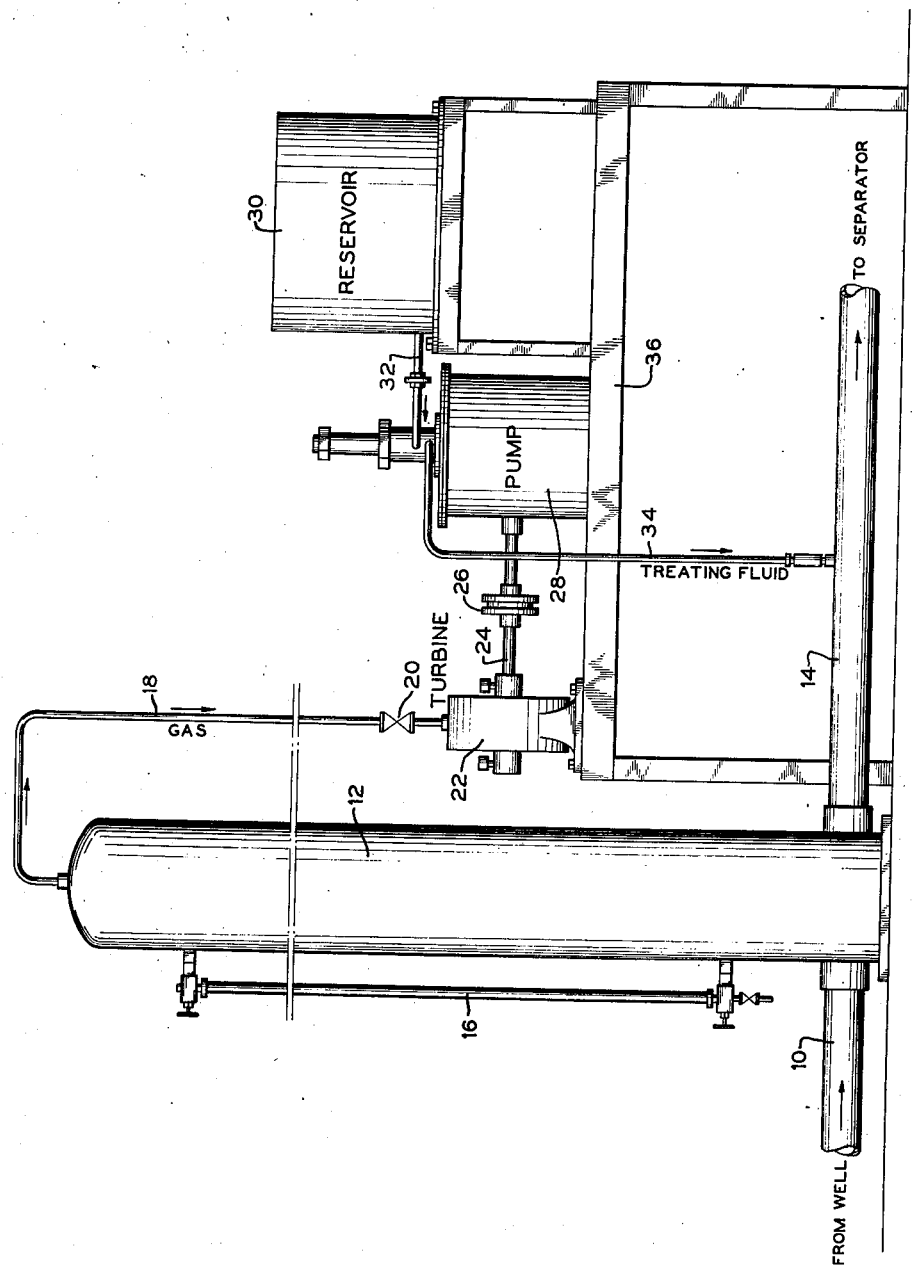

2,221,169

UNITED STATES PATENT OFFICE 2,221,169

OIL TREATING UNIT

Claude L. Raney and Howard C. Humphrey, Manvel, Tex., assignors to The Texas Company, New York, N. Y., a corporation of Delaware Application October 28, 1937, Serial No. 171,446

5 Claims. (Cl. 252—360)

This invention relates to liquid treating and more particularly to a method and apparatus for adding one liquid to another liquid in a predetermined proportion. The invention is especially useful in connection with the continuous treatment of crude oil with a fluid such as an emulsion-breaking chemical, as the crude oil flows from a well.

The primary object of the invention is to provide an apparatus of this type which will not require any separate source of outside power such as electricity, the gas which is present in the oil as it comes from the well comprising the source of power which is used. Another object is to provide an apparatus of this type which will have a minimum of moving parts and which will require but little attention in its operation.

In order to treat oil being produced from a well with an emulsion-breaking chemical, it is preferable that the chemical be pumped into the oil soon after the latter is taken from the well and in direct proportion to the rate of flow of the oil. In many instances, particularly in outlying districts where the wells are isolated from power or gas supply lines, it is often necessary to erect these lines over long distances in order to supply power to the proportioning apparatus so that the chemical may be pumped into the oil flow line near the well.

In accordance with this invention, the mixture of oil and gas coming from the well passes into a vertically arranged vessel which serves as a miniature oil and gas separator, the gas rising to the top of the vessel and the oil being led from the bottom to a suitable tank. The gas accumulating in the upper part of the vessel is used to operate a small turbine which in turn drives a pump for forcing the chemical into the oil line as it leaves the separating vessel. The oil is thus treated on the way to the storage tank with a minimum of expense. Since the amount and pressure of the gas in the vessel are directly proportional to the rate of flow of the oil gas mixture from the well and since the speed of the turbine will depend upon the pressure of the gas in the vessel, it will be seen that the chemical will be added to the oil in direct proportion to the rate of flow of the latter.

For a better understanding of the invention, reference may be had to the accompanying drawing which shows a vertical elevation of the apparatus.

Referring to the drawing, a pipe 10 leading from a well, not shown, is connected to a vertically elongated, closed vessel 12 and a second pipe 14 leading from the lower part of the vessel 12 may be connected at its other end to a suitable separator or tank. The vessel 12 serves as a surge chamber and also as a miniature gas-oil separator, the gas which is mixed with the oil passing through the pipe 10 collecting in the upper part of the vessel while the oil passes from the vessel through the outlet pipe 14. A suitable liquid level gauge 16 is connected to the vessel 12 so as to indicate the amount of oil present in the vessel. A pipe connection 18 leads from the top of the vessel 12 and through a suitable valve 20 to a gas turbine 22, the shaft 24 of which is connected by means of a suitable coupling to a pump 28. A reservoir 30 adapted to contain a treating fluid such as an emulsion-breaking chemical has an outlet conduit 32 connected to the inlet of the pump 28 while a pipe 34 connects the outlet of the pump to the pipe 14. The turbine, pump and reservoir may be mounted on a suitable table support 36, preferably arranged at a slight elevation above the pipe 14.

The gas which is present in the oil entering the vessel 12 through the pipe 10 will, as before stated, accumulate in the upper portion of the vessel and this gas being under pressure will actuate the turbine 22 to drive the pump 28 so as to force the treating fluid from the reservoir 30 into the oil leaving the vessel through the pipe 14. The oil will thus be treated on the way to the storage tank or main separator. The amount of gas and therefore the pressure of the gas accumulating in the vessel 12 will depend on the amount of the oil-gas mixture flowing through the pipe 10, and since the speed of the turbine 22 will be dependent upon the pressure of the gas in the vessel 12, the amount of treating fluid pumped into the pipe 14 will thus be directly proportional to the rate of flow of the oil through the pipe 14. The amount of treating fluid being injected into the oil can be controlled by varying the length of stroke of the pump 28 or by varying the pumping speed by controlling the amount of gas entering the turbine by means of the valve 20.

An apparatus has thus been provided which is simple in construction, which will require a minimum of supervision and by means of which a treating fluid can be added to the oil to be treated in controlled amounts which are directly proportional to the amount of oil to be treated.

Obviously many modifications and variations of the invention may be made without departing from the spirit and scope thereof, and therefore only such limitations should be imposed as are indicated by the appended claims.

We claim:

1. In an apparatus for treating crude oil with a chemical, a vertically elongated, closed vessel, a pipe for conducting a mixture of oil and gas to said vessel, an outlet oil pipe connected to the lower part of said vessel, a supply of treating chemical, a pump for forcing said chemical into said outlet pipe, means for driving said pump and means for conducting gas from the top of said vessel to said driving means to actuate said driving means at speeds proportional to the amount of oil and gas mixture flowing into said vessel.

2. In an apparatus for treating oil being produced from a well, a pipe line for conducting a mixture of oil and gas from the well, a closed vessel forming a surge chamber and connected to said pipe line, an outlet pipe line connected to the lower part of said vessel, a pump adapted to force a treating fluid into said outlet pipe line, a motor for driving said pump and a pipe connection between the top of said vessel and said motor, the arrangement being such that gas collecting in the upper part of said vessel will actuate said motor to drive said pump thus forcing the treating fluid into the oil in said outlet pipe line in an amount proportional to the rate of flow of oil and gas mixture into said vessel.

3. In an oil treating apparatus, a vertically elongated closed vessel, a pipe for conducting a mixture of oil and gas to said vessel, a second pipe for conducting oil from the lower part of said vessel, a supply of treating fluid, a pump for forcing said fluid into said second pipe, a turbine for driving said pump, and means for conducting gas accumulating in the upper part of said vessel to said turbine to actuate the latter, the arrangement being such that the speed of said turbine and thus the amount of treating fluid forced into said second pipe will vary directly in accordance with variations in pressure of the gas in said vessel, said gas pressure variations being proportional to the amount of gas-oil mixture flowing through said first mentioned pipe.

4. An oil treating apparatus connected to a flow line for conducting a mixture of oil and gas from a well, comprising a vertically elongated vessel forming a surge chamber connected to said flow line, an outlet oil line leading from the lower part of said vessel, a supply of treating fluid, and means for supplying said treating fluid to the oil in said outlet pipe in an amount directly proportional to the rate of flow of oil through said outlet line, said means comprising a pump connected to said fluid supply and to said outlet line, a motor for driving said pump and means for conducting gas from the upper part of said separator to said motor to actuate the latter.

5. An apparatus for adding treating fluid to oil being produced and flowing from a well, in amounts proportional to the rate of flow of said oil, which comprises means for separating gas from the oil and for maintaining the separated gas under its natural pressure, a supply of treating fluid, means for pumping the treating fluid into the oil to be treated and means actuated by said gas under its natural pressure for driving said pumping means.

CLAUDE L. RANEY.
HOWARD C. HUMPHREY.